United States Patent
Borlinghaus

(10) Patent No.: US 6,720,960 B2
(45) Date of Patent: Apr. 13, 2004

(54) METHOD FOR THE ANALYSIS AND EVALUATION OF AT LEAST THREE-DIMENSIONAL SPECIMEN DATA

(75) Inventor: Rolf Borlinghaus, Dielheim (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 107 days.

(21) Appl. No.: 09/949,879

(22) Filed: Sep. 12, 2001

(65) Prior Publication Data

US 2002/0035433 A1 Mar. 21, 2002

(30) Foreign Application Priority Data

Sep. 14, 2000 (DE) .......................... 100 45 873

(51) Int. Cl.⁷ .............................. G06T 15/00
(52) U.S. Cl. ...................................... 345/419
(58) Field of Search ......................... 345/419, 420, 345/423, 427, 619

(56) References Cited

U.S. PATENT DOCUMENTS 5,297,043 A * 3/1994 Tuy et al. ..................... 702/27
5,371,778 A * 12/1994 Yanof et al. ................... 378/4
5,999,165 A * 12/1999 Matsumoto ................. 345/157
6,411,298 B1 * 6/2002 Goto et al. ................. 345/427
6,603,868 B1 * 8/2003 Ludwig et al. ............. 382/128

FOREIGN PATENT DOCUMENTS

EP 0 908 849 4/1999

OTHER PUBLICATIONS

Cyrax Product Bulletin, Cyrax System Overview, CYRA Technologies, Inc., 5 pages, 1999*

* cited by examiner

Primary Examiner—Phu K. Nguyen
(74) Attorney, Agent, or Firm—Foley & Lardner

(57) ABSTRACT

The present invention concerns a method for the analysis and evaluation of at least three-dimensional specimen data that are preferably detected with a confocal scanning microscope. By way of an unequivocal input of the necessary process parameters, the intention is to extract and output a portion of the detected specimen data, on the basis of which an analysis and evaluation of the three- or multi-dimensional specimen data is possible. The method according to the present invention is characterized in that at least two points (14, 15) of the specimen data set of the detected specimen data are defined; that at least one plane (17) extending through the defined points (14, 15) is extracted from the specimen data set; and that the plane (17) is output, preferably graphically, on an output unit (13).

28 Claims, 7 Drawing Sheets

METHOD FOR THE ANALYSIS AND EVALUATION OF AT LEAST THREE-DIMENSIONAL SPECIMEN DATA

CROSS REFERENCE TO RELATED APPLICATIONS

This invention claims priority of the German patent application 100 45 873.4 which is incorporated by reference herein.

FIELD OF THE INVENTION

The present invention concerns a method for the analysis and evaluation of at least three-dimensional specimen data that are preferably detected with a confocal scanning microscope.

BACKGROUND OF THE INVENTION

Methods of the generic type have been known for some time, and are used principally in the context of devices that can detect three- or multidimensional specimen data. Such devices can be, for example, computerized tomographs, magnetic resonance tomographs, or confocal scanning microscopes. With confocal scanning microscopes in particular, multi-dimensional specimen data can be detected. This can involve, for example, a time series of a detected three-dimensional specimen, i.e. the same specimen is detected three-dimensionally at respective predefined times, yielding a four-dimensional specimen data set (X, Y, Z, t). A further example of the existence of a multidimensional specimen data set is the detection of a three-dimensional fluorescent specimen using a confocal scanning microscope, in which context a separate detection channel can be provided for each fluorescent dye that is used. The detected specimen data set consequently has four dimensions (X, Y, Z, $\lambda$).

The analysis and evaluation of multi-dimensional specimen data sets is problematic, however, in particular because of the large data volume. It is not readily possible to visualize specimen data sets whose dimension is greater than or equal to 3. A number of different visualization methods exist for this purpose. One cited purely by way of example is EP 0 908 849, which discloses a method and an apparatus with which, in a three-dimensional data set, a viewing point and a viewing direction proceeding from that viewing point can be defined. The three-dimensional specimen data set is then projected onto a plane that is perpendicular to the viewing direction, using the method of central projection with the viewing point as origin. The projected image is displayed on a monitor in the form of a pseudo-3D depiction.

The known analysis and evaluation methods are, however, problematic in many respects. Often the definition of the input values necessary for the respective method—for example points, lines, or displacement directions—needs to be performed by way of an interaction between user and computer. Often, however, this interaction requires extensive user training or a very considerable familiarization time, since following an interactive parameter input, the subsequent method steps often demand considerable processing time. If the result thereof does not meet expectations, another interactive input of the method parameters is necessary, after which the processing steps once again require processing time. For many applications, moreover, analysis and evaluation of the detected specimen does not require the utilization of a projection or some other complex processing method.

SUMMARY OF THE INVENTION

It is therefore the object of the present invention to describe and develop a method of the generic type with which, by unequivocal input of the necessary method parameters, it is possible to extract and output a portion of the detected specimen data, on the basis of which the three- or multi-dimensional specimen data can be analyzed and evaluated.

The method according to the present invention is achieved by the steps of:

detecting specimen data with a confocal scanning microscope and organizing the specimen data in a specimen data set, defining at least two points of the specimen data set of the detected specimen data;

extracting at least one plane extending through the defined points from the specimen data set;

and graphically outputting the plane on an output unit.

Definition of the points preferably represents an input of the method parameters within the meaning of the object cited initially.

What has been recognized according to the present invention is firstly that the definition or input of points of a specimen data set is possible after only a very short training period. In particular, the accuracy of the definition of a point is greater than that of the user interfaces in which scroll bars or arrow buttons must be modified and the subsequent method steps are performed (in time-consuming fashion), and the result is output, only after a modification to the corresponding input means. It has furthermore been recognized that the output of a single plane or individual planes of the specimen data sets is often sufficient for the analysis and evaluation of multi-dimensional specimen data, so that complex process steps in the form of calculations and output steps can advantageously be omitted or at least minimized. The definition of at least two points of the specimen data set defines a family of planes that is output on an output unit. A storage medium, a monitor, and/or a printer/plotter is provided as the output unit. Output over a network, e.g. the Internet, is also conceivable. Output on a monitor or printer/plotter is performed graphically.

If a multi-dimensional specimen data set is present, coordinate values are determined or defined for all but three coordinates of the specimen data set. The result is to define a three-dimensional partial data set, provided for further processing, of the multi-dimensional specimen data set. The three coordinates whose values were not determined or defined span this partial data set. For example, a three-dimensional data set of a specimen could be acquired at each of twenty different points in time using a confocal scanning microscope. This four-dimensional specimen data set—comprising the coordinates X, Y, Z, and t—would be reduced, by the definition of a specific time coordinate (e.g. the acquisition time corresponding to the tenth specimen data set), to a three-dimensional partial data set for further processing. The partial data set that is further processed is thus spanned by the three undetermined coordinates (X, Y, and Z).

In a first variant, provision is made for three points of the detected specimen data to be determined. This determination is accomplished in a three-dimensional specimen data set. Determination of the points could be accomplished by numerical input or by mouse clicking, i.e. very generally using means for marking or selecting points. An automatic determination would also be conceivable; for example, the three points could be the result of a segmentation process or a specimen recognition process.

Definition of the points is preferably accomplished on the basis of three mutually orthogonal section planes. These section planes visualize individual two-dimensional image sections through the three-dimensional specimen data set, in which context respective planes parallel to the XY plane, XZ plane, and YZ plane are usually displayed simultaneously on a monitor. The three section planes possess one common point, which can lie in the specimen to be analyzed. It would then be possible, by mouse clicking, to define in the displayed section planes three points for extraction of a plane from the specimen data set; it is not necessary to define a point in each displayed section plane.

The plane extending through three points is output on an output unit, i.e. for example on a monitor or color printer.

In a second variant, provision is made for only two points to be determined. This could be useful for analysis and evaluation of the detected specimen if the specimen has an elongated or cylindrical shape. The first point could accordingly be defined at one end of the specimen, and the second point at the other end of the specimen. The two defined points define a rotation axis. The planes that contain the rotation axis are then output. The planes are output in a sequence that forms a greater intersection angle each time with reference to the plane that was output first. For example, the plane that contains the rotation axis and e.g. the X axis could be output first. The next plane to be output could form an intersection angle of, for example, 5 degrees with the plane that was output first. The third plane to be output could form an intersection angle of 10 degrees with reference to the plane output first, so that the angle between the second and third planes is also 5 degrees. Very generally, provision is made for the intersection angle to increase by a constant value each time. The planes are output graphically, preferably on a monitor.

For the second variant, provision is made for the graphical output of the respective plane to be accomplished in a three-dimensional (3D) depiction of the detected specimen, displaying its spatial arrangement. In this context, provision is preferably made for a perspective 3D depiction that could be accomplished, for example, in the form of a vanishing-point depiction or in a parallel projection, i.e. a vanishing-point depiction in which the vanishing point is located at infinity. The rotation axis could also be plotted in the 3D depiction. In a preferred depiction, the detected specimen is depicted as being partially transparent, and the particular plane that is output is superimposed on the transparent depiction of the specimen. This advantageously clarifies the spatial relationship between the detected specimen and the plane being output, which considerably facilitates analysis of a complex three-dimensional specimen. Because of the 3D depiction of the planes being output, with this form of output only a small portion of the specimen is visible in many orientation directions of the plane. This is the case in particular in an orientation that is aligned substantially perpendicular to the entire depiction plane.

In the interest of flexible analysis and evaluation, provision is made hereinafter for defining, on the basis of a plane that has been output, the orientation and/or position of a further plane which is then output. A correction of the originally defined points can thereby be made immediately, i.e. the points do not need to be defined again in this stage of the method in another depiction form in order to extract the plane that is then desired. In the same fashion, the orientation and/or position of a previously defined rotation axis could be modified, resulting in output of the planes containing the new rotation axis. This procedure advantageously makes possible an optimization of the evaluation and analysis of the detected specimen, since further specimen regions of interest may have become detectable upon previous output of one or more planes. These regions can then be examined in more detail by directly defining once again the orientation and/or position of a further plane or a further rotation axis, for example directly in a perspective 3D depiction.

It would also be useful to output planes which are oriented parallel to a plane (preferably selected by the user) that has been output, and which each have an equidistant spacing. This output possibility corresponds to the usual output of sectional image planes, in which the planes that are output are oriented parallel to one of the coordinate planes.

In a specific output form, provision is made for graphical output of the planes to be accomplished two-dimensionally in each case. This could be accomplished in a two-dimensional rectangular region on a monitor; several two-dimensional rectangular regions could be output on a monitor in the form of a gallery, or each particular plane could be output on the entire monitor. The use of multiple monitors is also conceivable.

Very generally, the graphical output of the individual planes is accomplished in a time sequence. In this context, the speed profile of the time sequence could be defined by a user. An interactive request for output of the next plane by a user—for example by means of a keystroke or mouse click—would also be conceivable in this context. For uniform output of the planes and thus an analysis of the specimen that is ergonomic for the user, provision is made for a substantially constant speed profile of the time sequence.

Prior to output of a plane, provision is made for a conversion to a common output grid of identical grid size and identical number of grid points. This common output grid is used for all planes that are output. The three-dimensional specimen data set generally exists in digital form, and an extraction of an individual plane is directly possible only if the extracted plane extends parallel to one of the three coordinate planes. As soon as the orientation of the plane being extracted deviates therefrom, however, it is necessary to extract from the specimen data set individual specimen points for which no directly detected values exist. The reason for this is the discrete digital grid that is defined by the imaging process of the confocal scanning microscope. A plane that has, for example, an intersection angle of 45 degrees with the XY plane, and that contains the X axis, would have along the X direction the same pixel spacing or grid spacing as the detected three-dimensional specimen data set. In the direction perpendicular thereto, however, the pixel spacing would have twice that value, since only there can a grid point of the detected three-dimensional specimen data set be extracted in each case. Depending on the orientation of the plane that is to be output, however, this would result in different output grids, making successful analysis and evaluation of a detected specimen difficult and, in some circumstances, even impossible.

An interpolation process, which for example could be implemented on the control computer of the scanning microscope, is accordingly provided for as the conversion for the purpose of output in a common output grid. When a measured value is to be extracted from the three-dimensional specimen data set at a location at which a measured grid point does not exist, a value that corresponds to the average of the adjacent measured values is therefore output at that location. The conversion could comprise a measured value adaptation that, in particular, compensates for physics-related imaging artifacts of the imaging process. One example of such an imaging artifact is bleaching of the fluorescent dyes. In this, in the context of a three-dimensional specimen detection, the measured fluorescent light intensity in the section plane detected first is, because of the bleaching behavior of the fluorescent dyes, greater than in the section plane detected last.

In very particularly advantageous fashion, provision is made for a plane that has been output to be re-imaged with the confocal scanning microscope. For this reimaging of the plane, the imaging parameters of the confocal scanning microscope are optimized. Depending on the orientation and position of the selected plane, the plane that has been output can, as a result of the interpolation process or the conversion to a common output grid, exhibit a spatial resolution that is far from optimum. Re-imaging of a plane could then be accomplished with an optimum spatial resolution accompanied by maximal noise suppression actions, for example by means of image averaging. Usually the plane is selected by the user before imaging.

BRIEF DESCRIPTION OF THE DRAWINGS

There are various ways of advantageously embodying and developing the teaching of the present invention. In conjunction with the explanation of the preferred exemplary embodiments of the invention with reference to the drawings, an explanation is also given of generally preferred embodiments and developments of the teaching. In the drawings:

FIG. 3a schematically depicts a first variant of the method;

FIG. 3b shows what is depicted in FIG. 3a, the orthogonal section planes of FIG. 2b being drawn in;

FIG. 5a schematically depicts a second variant of the method; and

FIG. 5b shows what is depicted in FIG. 5a, the orthogonal section planes of FIG. 4b being drawn in.

DETAILED DESCRIPTION OF THE INVENTION

Figure 1:
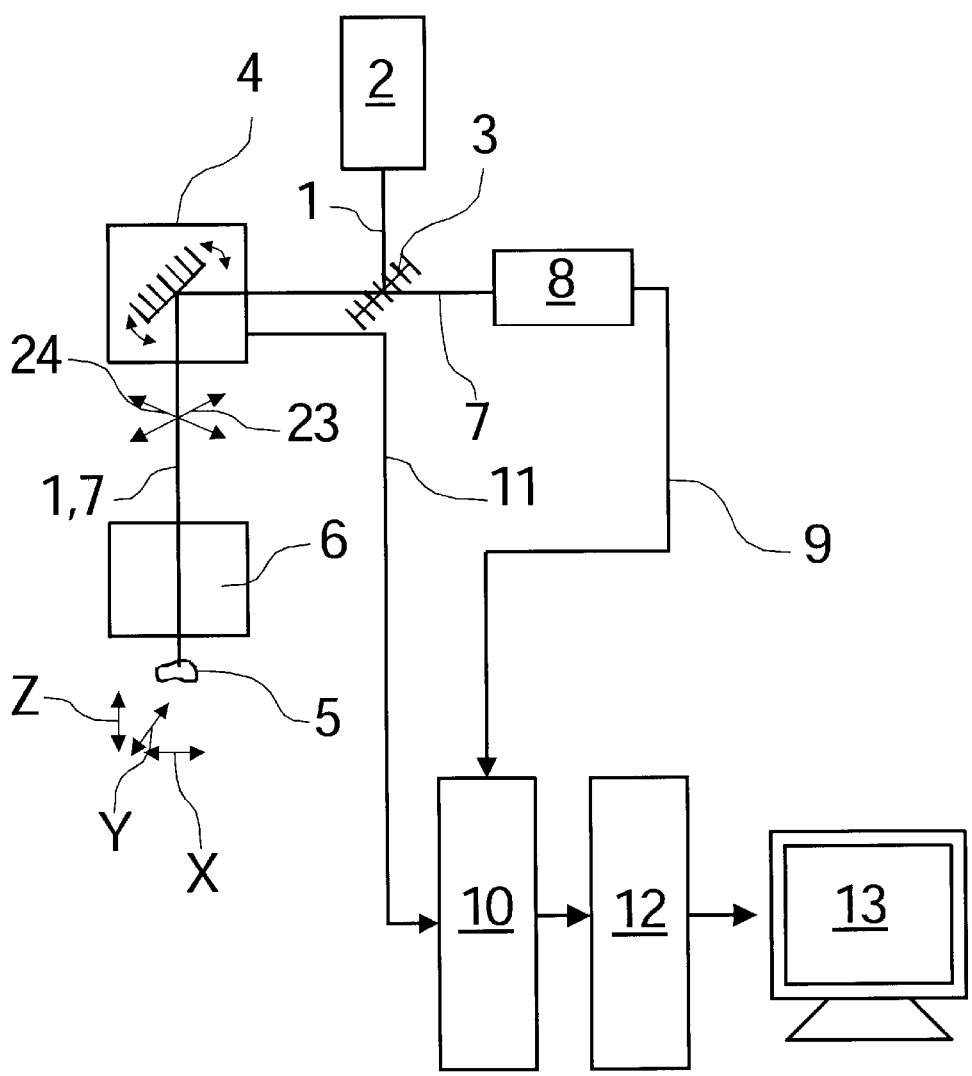
FIG. 1 schematically depicts a confocal scanning microscope for carrying out the method according to the present invention.

FIG. 1 schematically depicts a confocal scanning microscope with which three- or multi-dimensional specimen data sets can be generated. In the confocal scanning microscope shown in FIG. 1, light 1 of laser light source 2 is reflected by a dichroic beam splitter 3 toward beam deflection apparatus 4. Beam deflection apparatus 4 on the one hand reflects light beam 1 toward microscope optical system 6, and on the other hand scans light beam 1 in two directions 23, 24 substantially perpendicular to one another. Laser light 1 that serves to illuminate specimen 5 is focused by microscope optical system 6 into specimen 5. Fluorescent light 7 emitted by specimen 5 passes along the optical beam path in the opposite direction to dichroic beam splitter 3. As a result of its spectral properties (Stokes shift), fluorescent light 7 can pass through dichroic beam splitter 3 and is detected by detector 8. Detector 8 conveys to control and processing device 10 an electrical signal 9 that is proportional to the power of the fluorescent light. Beam deflection apparatus 4 transfers present position data 11 to control and processing unit 10 so that control and processing unit 10 can perform allocation of the incoming intensity signal 9 to the corresponding beam or focus position of light beam 1 in specimen 5. With the aid of beam deflection apparatus 4, illuminating light beam 1 can be deflected in the X and Y directions. For three-dimensional data acquisition, specimen 5 is moved with the aid of a microscope stage (not depicted) along the Z direction relative to microscope optical system 6. The present position data of the microscope stage are also conveyed to control and processing unit 10. Control and processing unit 10 corrects the analog signals coming into it, which may be distorted and disrupted. Control and processing unit 10 converts the analog signals into digital signals, and conveys them to control computer 12. The detected specimen data can be output on monitor 13.

Figure 2:
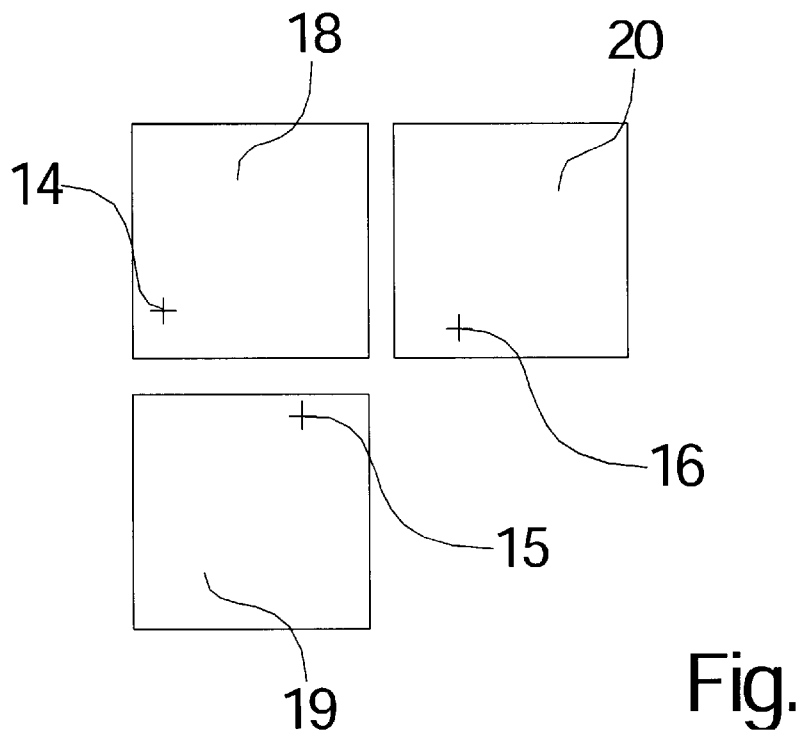
FIG. 2a schematically depicts orthogonal section planes in each of which a point has been defined or selected.
FIG. 2b schematically depicts the orthogonal section planes that comprise the same point.
Figure 2:
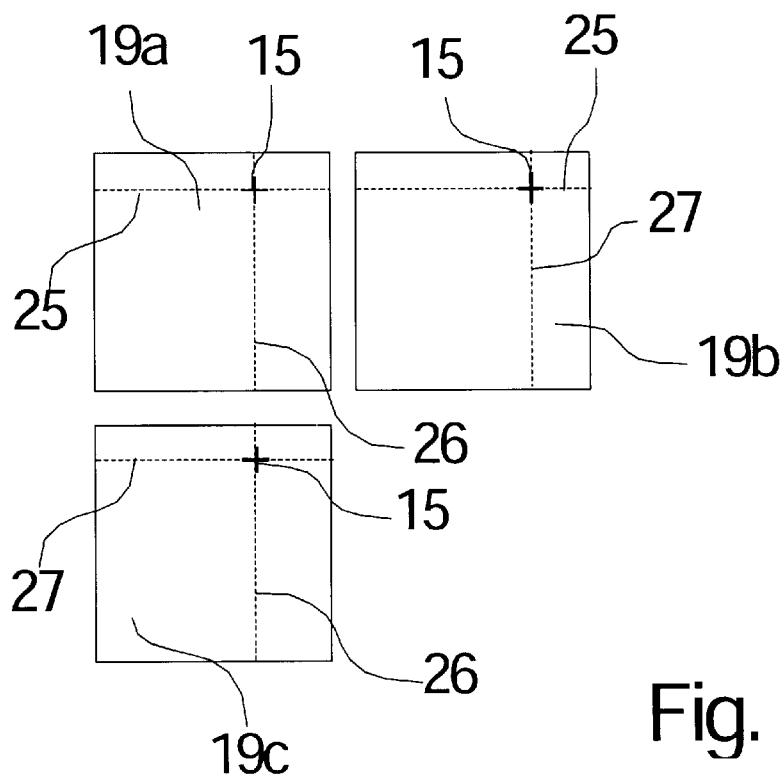

FIG. 2a shows that according to the present invention, three points 14, 15, 16 of the specimen data set of the detected specimen data are defined. Points 14, 15, 16 defined in FIG. 2a define a plane 17 that is extracted from the specimen data set and output graphically on monitor 13.

Figure 4:
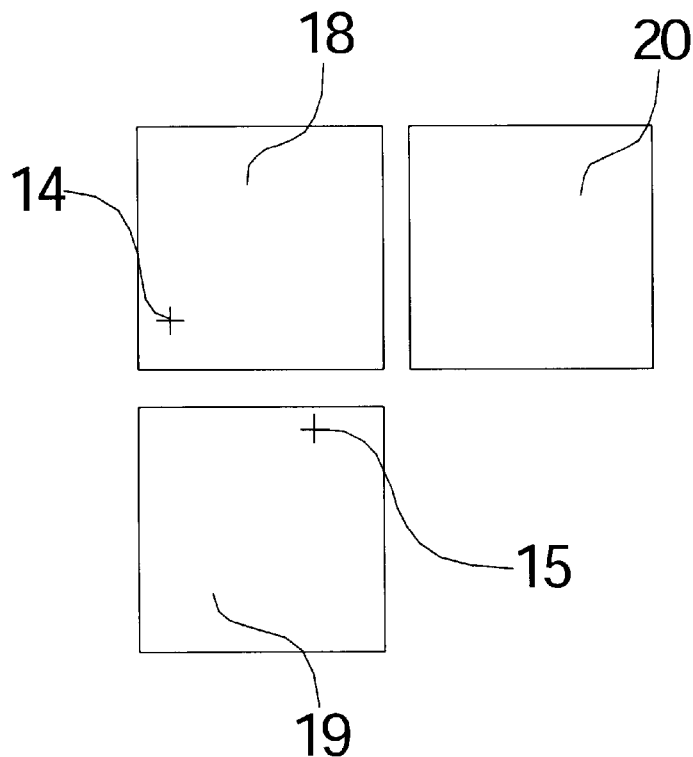
FIG. 4a schematically depicts orthogonal section planes in which one point is defined in each of two planes.
FIG. 4b schematically depicts the orthogonal section planes that comprise the same point.
Figure 4:
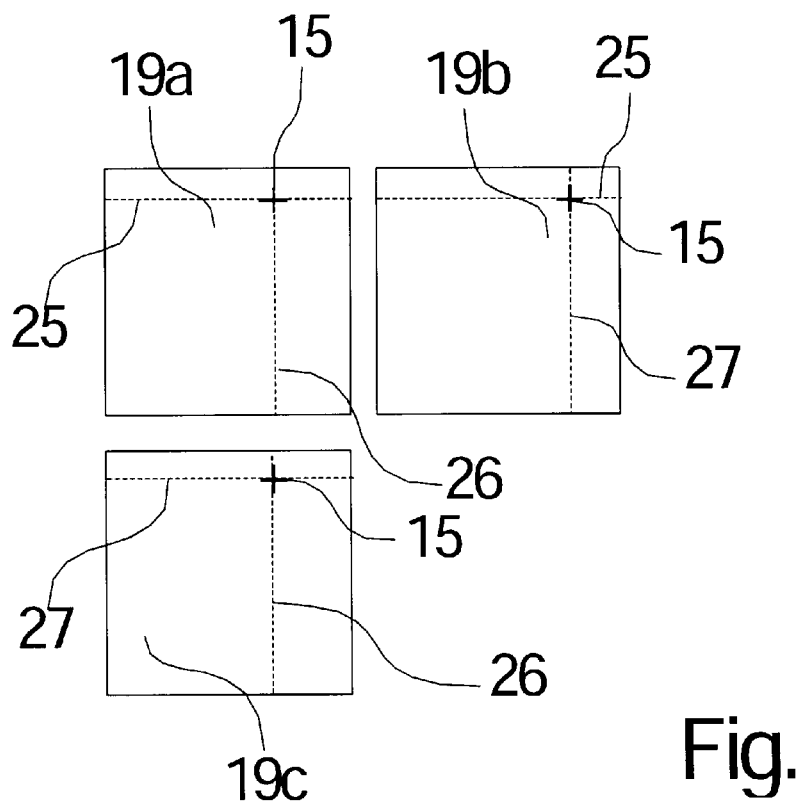

The manner in which point 15 is defined, with the aid of the three mutually orthogonal section planes 19a, 19b, 19c that are shown in FIGS. 2b and 4b, is explained below. In this context, section plane 19a is an XY plane, plane 19b a YZ plane, and plane 19c an XZ plane. For definition or selection of point 15, three orthogonal section planes are output graphically on monitor 13, the central section plane of the 3D specimen data set of the detected specimen data being in each case displayed first. A user can then sequentially view, or "scroll through," the section planes parallel to the XY plane, i.e. the individual planes are shown in the same region on the monitor (at the location of plane 19a) based on corresponding input by the user. If the user then finds a location in the detected specimen that is of interest to him or her, he or she can then, by means of a corresponding input, define that point-point 15, in the present case of FIGS. 2b and 4b—in the corresponding XY plane. The X, Y, and Z coordinates of point 15 are thereby defined. Planes 19b and 19c then each display the section planes that also comprise point 15. Lines 25, 26, and 27 are respectively plotted in planes 19a, 19b, and 19c, providing the user with an orientation aid as to the location at which the defined point in the one plane (e.g. 19a) is located in the other planes (e.g. 19b and 19c). Point 15 can also be defined in similar fashion proceeding from plane 19b and/or 19c. In this exemplary embodiment, one point was defined in each of planes 18, 19, and 20.

Figure 3:
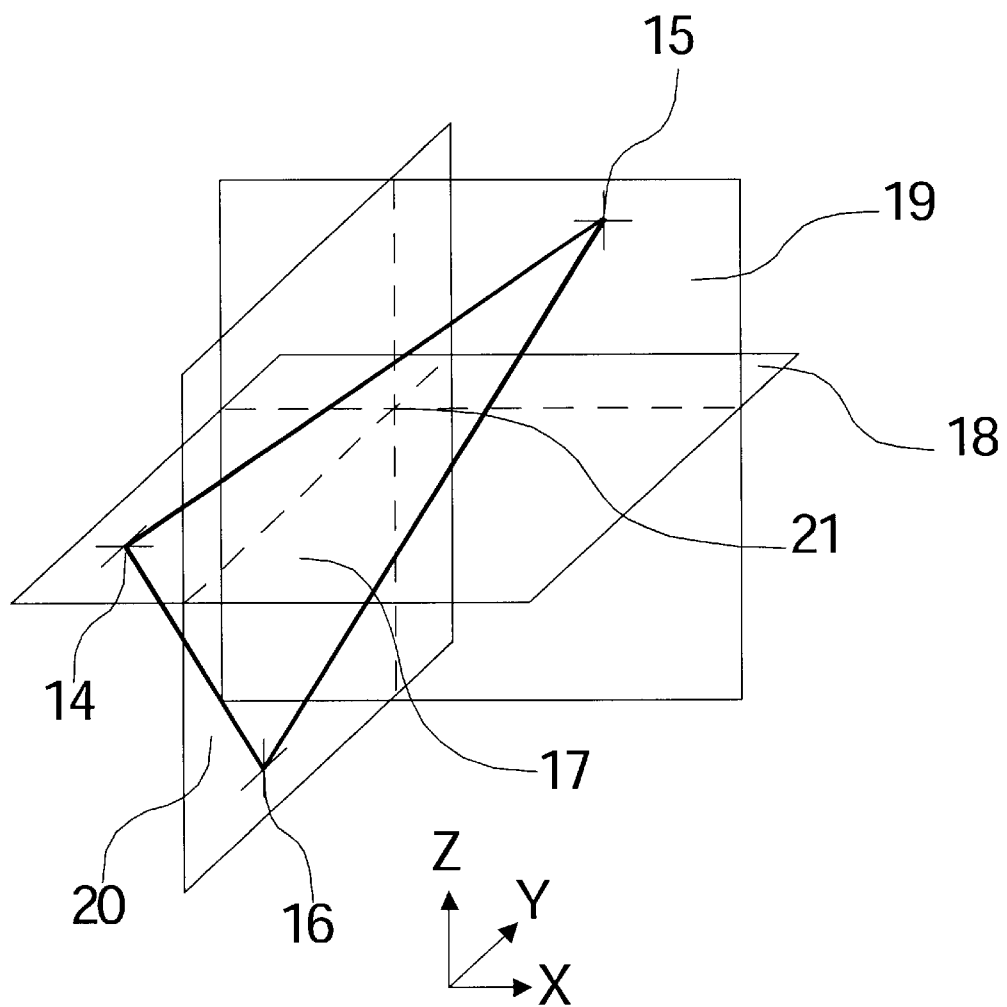
Figure 3:
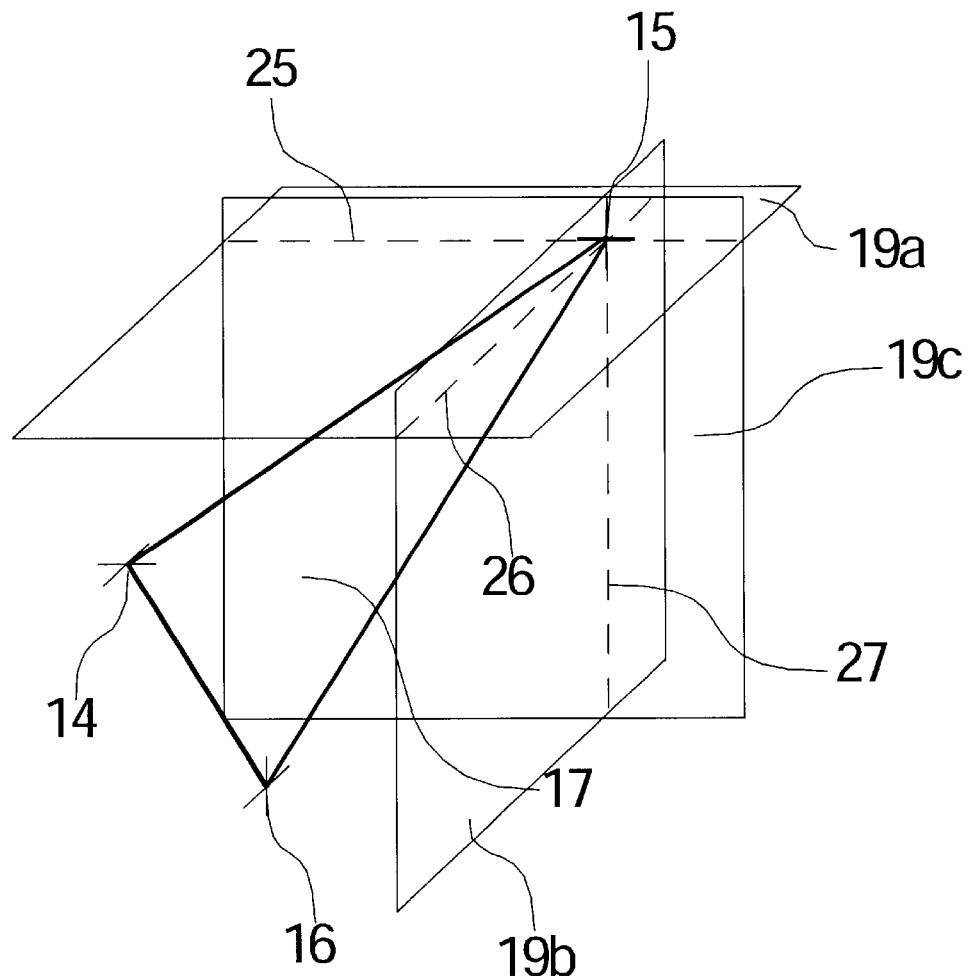

The three orthogonal section planes have in common a point 21 (shown in FIG. 3a), but it is not relevant for definition of the three points 14, 15, and 16. The output of plane 17 is shown in FIGS. 3a and 3b. The orthogonal section planes 18, 19, 20 which respectively comprise points 14, 15, and 16 are depicted three-dimensionally in their spatial positions relative to one another. The three-dimensional depiction is a parallel perspective depiction, in which the lines (drawn, for example, along the Y direction) are drawn parallel to one another. The defined points 14, 15, 16 are also drawn in. Points 14, 15, 16 span plane 17, which is indicated by the schematically depicted triangle. FIG. 3b shows planes 19a, 19b, and 19c, which correspond to the planes of FIG. 2b. They have point 15 in common. For points 14 and 16, the corresponding section planes that respectively comprise these points are not drawn in.

Figure 5:
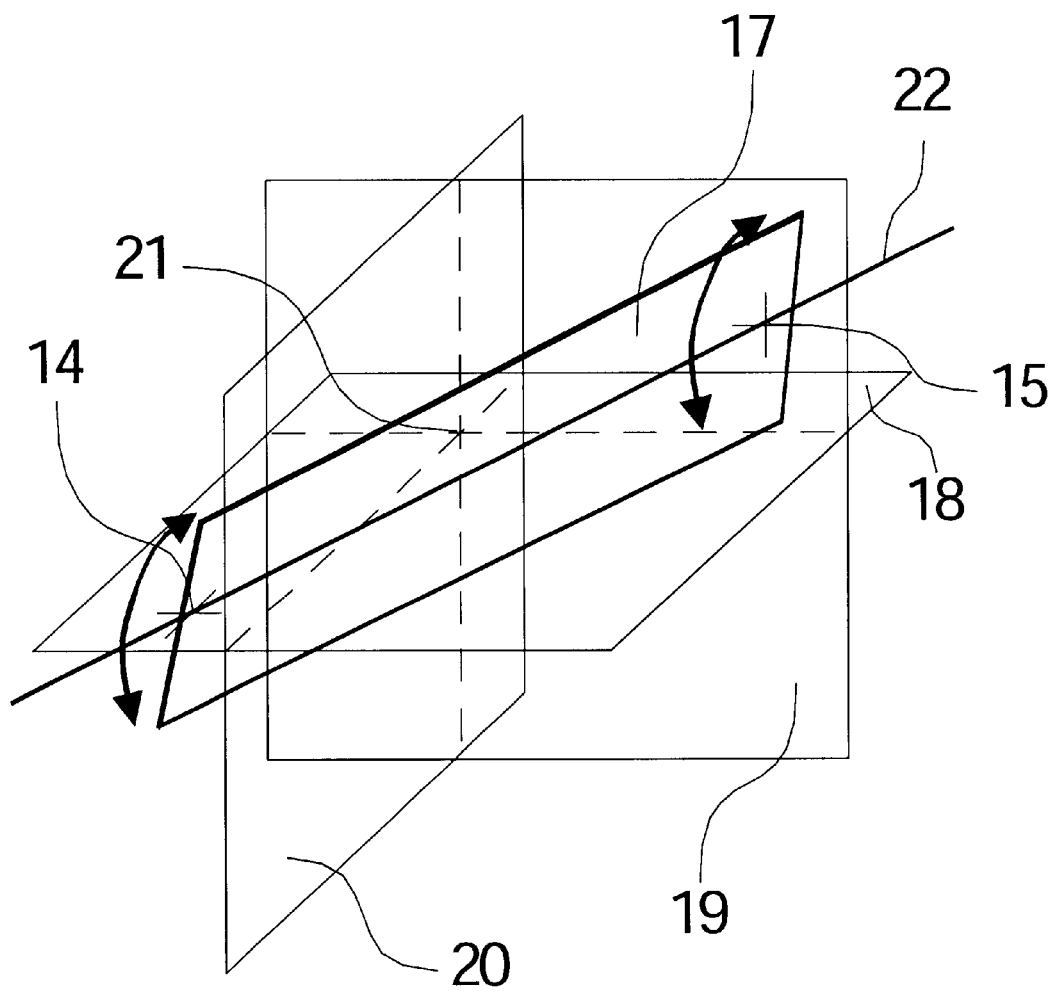
Figure 5:
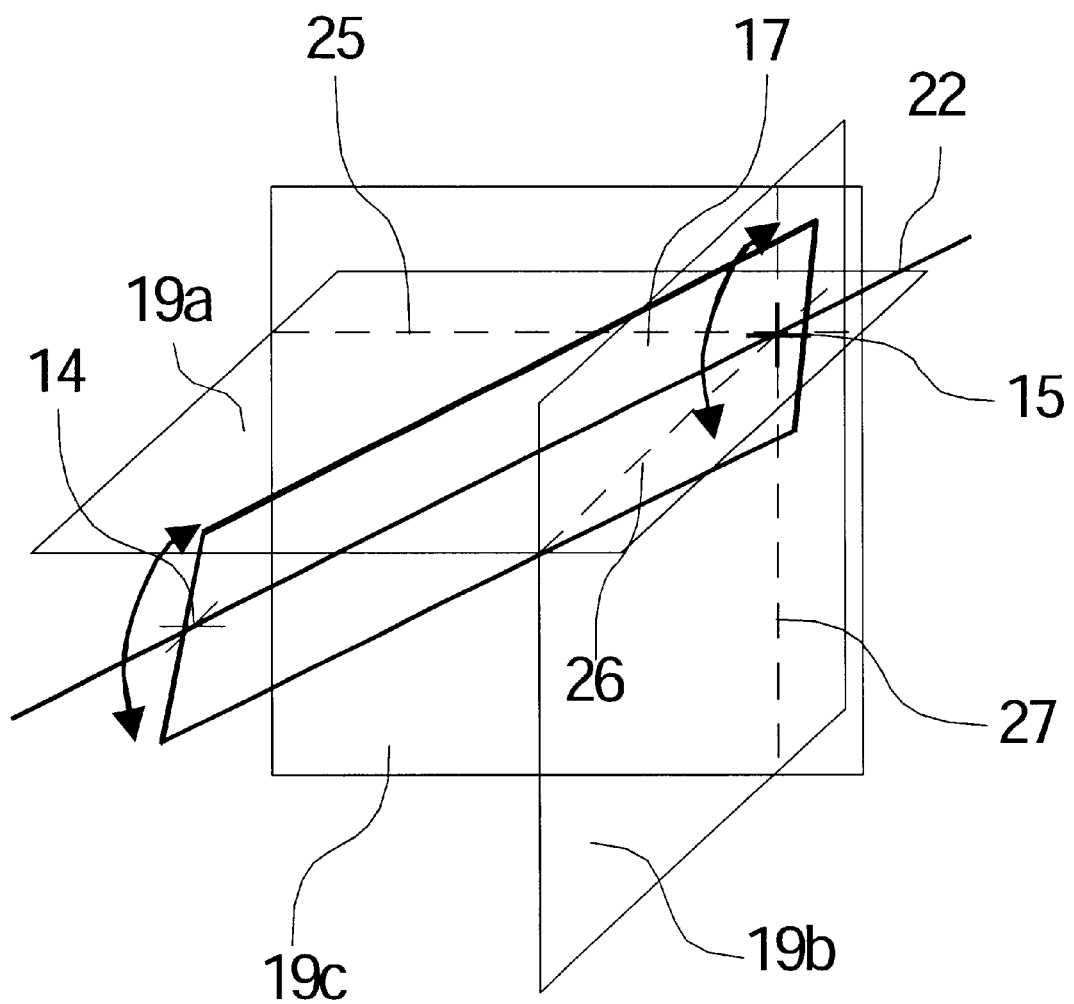

A second variant method according to the present invention provides for two points 14, 15 to be determined. These two points 14, 15 are defined in the orthogonal section planes 18, 19, 20 and 19a, 19b, 19c shown in FIGS. 4a and 4b, respectively, again in accordance with the procedure already described with reference to FIGS. 2a and 2b. For example, point 15 was defined in plane 19a, and point 14 was defined in another plane 19a (not depicted). Points 14, 15 define a rotation axis 22 that is shown in FIGS. 5a and 5b. FIGS. 5a and 5b also show that plane 17 is output first. Further planes that contain rotation axis 22 are output, although this is not shown in FIG. 5. Plane 17 and the further planes are output graphically on monitor 13.

Graphical output of plane 17 of FIGS. 5a and 5b is performed once again in a perspective 3D depiction of the detected specimen, indicating its spatial arrangement. In FIG. 5a as well, the three orthogonal section planes 18, 19, 20 shown in FIG. 4a are depicted in perspective, along with the spatial orientation of a portion of plane 17 drawn in rectangular fashion. Instead of planes 18, 19, 20, FIG. 5b shows in perspective the three orthogonal section planes 19a, 19b, 19c shown in FIG. 4b. The spatial arrangement of the plane that has been output, relative to the detected specimen (not depicted), can be deduced from the rectangular portion of plane 17.

In conclusion, be it noted very particularly that the exemplary embodiments discussed above serve merely to describe the teaching claimed, but do not limit it to the exemplary embodiments.

What is claimed is:

1. A method for the analysis and evaluation of at least a three-dimensional specimen, comprising the steps of:
    detecting specimen data with a confocal scanning microscope and organizing the specimen data in a specimen data set;
    defining at least two points of the specimen data set of the detected specimen data;
    extracting at least one plane extending through the defined points from the specimen data set;
    graphically outputting the plane on an output unit;
    defining the orientation and position of a further plane on the basis of the graphically output plane; and
    outputting the position of the further plane.

2. The method as defined in claim 1, wherein three points of the detected specimen data are determined.

3. The method as defined in claim 2, wherein three mutually orthogonal section planes are provided and the definition of the three points is accomplished on the basis of the three mutually orthogonal section planes wherein a point is defined in each of the orthogonal planes.

4. The method as defined in claim 3, wherein the plane extending through the three points is output on the output unit of the confocal scanning microscope.

5. The method as defined in claim 1, wherein a rotation axis is defined by the two points of the specimen data set determined from the detected specimen data.

6. The method as defined in claim 5, wherein the orientation and position of the previously defined rotation axis is modified, resulting in output of the planes containing the new rotation axis.

7. A computer readable storage medium containing computer code for accomplishing the method of claim 1.

8. A method for the analysis and evaluation of at least a three-dimensional specimen, comprising the steps of:
    detecting specimen data with a confocal scanning microscope and organizing the specimen data in a specimen data set;
    defining at least two points of the specimen data set of the detected specimen data;
    extracting at least one plane extending through the defined points from the specimen data set; and
    graphically outputting the plane on an output unit;
    wherein a rotation axis is defined by the two points of the specimen data set determined from the detected specimen data; and
    wherein the planes containing the defined rotation axis are output and the output is done in a sequence that forms a greater intersection angle each time with reference to the plane that was output first.

9. The method as defined in claim 8, wherein a graphical output of the respective plane is accomplished in a 3D depiction of the detected specimen displaying its spatial arrangement.

10. The method as defined in claim 9, wherein the detected specimen is depicted as being partially transparent, and the particular plane that is output is superimposed on the transparent depiction.

11. The method as defined in claim 9, wherein the 3D depiction is performed in perspective.

12. A method for the analysis and evaluation of at least a three-dimensional specimen, comprising the steps of:
    detecting specimen data with a confocal scanning microscope and organizing the specimen data in a specimen data set;
    defining at least two points of the specimen data set of the detected specimen data;
    extracting at least one plane extending through the defined points from the specimen data set; and
    graphically outputting the plane on an output unit;
    wherein prior to output of a plane, a conversion is performed to a common output grid of identical grid size and identical number of grid points, which is used for all planes that are output.

13. A method for the analysis and evaluation of at least a three-dimensional specimen, comprising the steps of:
    detecting specimen data with a confocal scanning microscope and organizing the specimen data in a specimen data set;
    defining at least two points of the specimen data set of the detected specimen data;
    extracting at least one plane extending through the defined points from the specimen data set; and
    graphically outputting the plane on an output unit;
    wherein a plane that has been output is re-imaged with the confocal scanning microscope, the imaging parameters of the confocal scanning microscope being optimized therefor.

14. The method as defined in claim 13, wherein the plane is selected by a user.

15. A method for the analysis and evaluation of at least a three-dimensional specimen, comprising the steps of:
    detecting specimen data with a confocal scanning microscope and organizing the specimen data in a specimen data set;
    receiving a first signal from a user defining one point of the specimen data set of the detected specimen data;

receiving a second signal from the user defining another point of the specimen data set of the detected specimen data;

extracting at least one plane extending through the defined points from the specimen data set; and graphically outputting the plane on an output unit only after the second signal is received.

16. The method as defined in claim 15, wherein three points of the detected specimen data are determined.

17. The method as defined in claim 16, wherein three mutually orthogonal section planes are provided and the definition of the three points is accomplished on the basis of the three mutually orthogonal section planes wherein a point is defined in each of the orthogonal planes.

18. The method as defined in claim 17, wherein the plane extending through the three points is output on the output unit of the confocal scanning microscope.

19. The method as defined in claim 15, wherein a rotation axis is defined by the two points of the specimen data set defined from the detected specimen data.

20. The method as defined in claim 19, wherein the planes containing the defined rotation axis are output and the output is done in a sequence that forms a greater intersection angle each time with reference to the plane that was output first.

21. The method as defined in claim 20, wherein a graphical output of the respective plane is accomplished in a 3D depiction of the detected specimen displaying its spatial arrangement, the 3D depiction preferably being performed in perspective.

22. The method as defined in claim 21, wherein the detected specimen is depicted as being partially transparent, and the particular plane that is output is superimposed on the transparent depiction.

23. The method as defined in claim 19, wherein the orientation and position of the previously defined rotation axis is modified, resulting in output of the planes containing the new rotation axis.

24. The method as defined in claim 15, comprising the steps of:

defining the orientation and position of a further plane on the basis of a plane that has been output, and outputting the position of the further plane.

25. The method as defined in claim 15, wherein prior to output of a plane, a conversion is performed to a common output grid of identical grid size and identical number of grid points, which is used for all planes that are output.

26. The method as defined in claim 15, wherein a plane that has been output is re-imaged with the confocal scanning microscope, the imaging parameters of the confocal scanning microscope being optimized therefor.

27. The method as defined in claim 26, wherein the plane is selected by the user.

28. A computer readable storage medium containing computer code for accomplishing the method of claim 15.

* * * * *